United States Patent
Kim et al.

(10) Patent No.: US 8,332,996 B2
(45) Date of Patent: Dec. 18, 2012

(54) CONDUCTIVE PASTE COMPOSITION FOR INNER ELECTRODES AND METHOD OF MANUFACTURING MULTILAYER CAPACITOR

(75) Inventors: Jong Han Kim, Gyunggi-do (KR);
Hyun Chul Jung, Gyunggi-do (KR);
Jwa Jin Yoon, Gyunggi-do (KR); Jae Joon Lee, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 108 days.

(21) Appl. No.: 12/858,897

(22) Filed: Aug. 18, 2010

(65) Prior Publication Data

US 2011/0154660 A1    Jun. 30, 2011

(30) Foreign Application Priority Data

Dec. 30, 2009    (KR) .................. 10-2009-0134449

(51) Int. Cl.
  *H01G 7/00*    (2006.01)
(52) U.S. Cl. .............. 29/25.42; 29/25.41; 29/592.1; 29/825; 252/512; 252/514
(58) Field of Classification Search ............ 29/25.41, 29/25.42, 592.1, 825; 252/512, 514
See application file for complete search history.

(56) References Cited

U.S. PATENT DOCUMENTS

| | | | |
|---|---|---|---|
| 6,494,931 B1 * | 12/2002 | Mukuno et al. ............. 75/255 |
| 7,485,244 B2 * | 2/2009 | Nakamura et al. ........... 252/512 |
| 7,632,369 B2 * | 12/2009 | Sato et al. ................. 156/89.11 |
| 7,718,093 B2 * | 5/2010 | Konno ....................... 252/512 |
| 2001/0018116 A1 * | 8/2001 | Hayashi et al. ............... 428/209 |
| 2006/0197062 A1 * | 9/2006 | Nakamura .................. 252/500 |
| 2007/0181856 A1 | 8/2007 | Park et al. |

FOREIGN PATENT DOCUMENTS

| | | |
|---|---|---|
| CN | 1799109 A | 7/2006 |
| JP | 05-020921 | 1/1993 |
| JP | 2000-076930 | 3/2000 |
| JP | 2003-203824 | 7/2003 |
| JP | 2004-200450 | 7/2004 |
| JP | 2005-097326 | 4/2005 |

(Continued)

OTHER PUBLICATIONS

Korean Office Action, w/ English translation thereof, issued in Korean Patent Application No. 10-2009-0134449, dated Sep. 7, 2011.

(Continued)

*Primary Examiner* — Carl Arbes

(74) *Attorney, Agent, or Firm* — McDermott Will & Emery LLP

(57) ABSTRACT

Provided are a conductive paste composition for inner electrodes and a method of manufacturing a multilayer ceramic capacitor using the same. The conductive paste composition for inner electrodes includes a metal powder having an average particle size ranging from 50 nm to 300 nm, and 4 to 10 parts by weight of a binder resin. The binder resin contains at least one resin selected from the group consisting of a high-molecular-weight polyvinylbutyral resin having a weight-average molecular weight of 250 thousand to 400 thousand, a low-molecular-weight polyvinylbutyral resin having a weight-average molecular weight of 50 thousand to 150 thousand, and a rosin ester.

6 Claims, 1 Drawing Sheet

FOREIGN PATENT DOCUMENTS

| | | |
|---|---|---|
| JP | 2007-116083 | 5/2007 |
| JP | 2008-277766 | 11/2008 |
| JP | 2009-013494 | 1/2009 |
| JP | 2009-147359 | 7/2009 |
| KR | 10-2006-0006021 | 1/2006 |
| KR | 10-2007-0080091 A | 8/2007 |
| WO | WO 2009/035453 A1 | 3/2009 |

OTHER PUBLICATIONS

Japanese Office Action, w/ English translation thereof, issued in Japanese Patent Application No. JP 2010-181827 dated Feb. 7, 2012.

Chinese Office Action with English Translation issued in Chinese Application No. 201010255736.5 issued on May 21, 2012.

\* cited by examiner

A-A'

CONDUCTIVE PASTE COMPOSITION FOR INNER ELECTRODES AND METHOD OF MANUFACTURING MULTILAYER CAPACITOR

CROSS-REFERENCE TO RELATED APPLICATIONS

This application claims the priority of Korean Patent Application No. 10-2009-0134449 filed on Dec. 30, 2009, in the Korean Intellectual Property Office, the disclosure of which is incorporated herein by reference.

BACKGROUND OF THE INVENTION

1. Field of the Invention

The present invention relates to a conductive paste composition for inner electrodes and a method of manufacturing a multilayer ceramic capacitor using the same, and more particularly, to a conductive paste composition for inner electrodes having excellent adhesiveness with a dielectric layer and printability, and a method of manufacturing a multilayer ceramic capacitor using the same.

2. Description of the Related Art

In general, as various electronic devices have shrunk in size, electronic components mounted in electronic devices have also tended to become compact and highly functional. Following this trend, ceramic electronic components are now required to be more compact and have higher functionality than ever before.

To realize a compact and high-capacity multilayer ceramic capacitor among ceramic electronic components, a thinning of a dielectric layer constituting part of the multilayer ceramic capacitor is strongly required. A thickness of a dielectric green sheet forming the dielectric layer has recently been reduced to several micrometers or less. Generally, to manufacture the dielectric green sheet, a ceramic paste is prepared first, which is comprised of a ceramic powder, a binder (an acryl-based resin, a butyral-based resin, or the like), a plasticizer (phthalate esters, glycols, adipic acid, phosphoric acid esters, or the like), and an organic solvent (toluene, MEK, acetone, or the like). Thereafter, the ceramic paste is applied to a carrier sheet (a support body made of PET or PP) using a doctor-blade method, and dried by heating.

Afterwards, a conductive paste for inner electrodes containing a metal powder, a binder, and so forth is printed on the ceramic green sheet in a predetermined pattern, and dried to thereby form an inner electrode pattern. The ceramic green sheets provided with the inner electrode layers are then laminated multiple times to thereby manufacture a ceramic laminate. Thereafter, the ceramic laminate is cut into a chip to form a green chip. Next, the green chip is subjected to a firing process, and an outer electrode is then formed thereon, thereby completing a multilayer ceramic capacitor.

The conductive paste for inner electrodes used in a related art printing method is comprised of a metal powder, an ethyl cellulose resin, and various organic additives. However, the ethyl cellulose resin may cause a delamination phenomenon from a dielectric layer during manufacturing of multilayer ceramic capacitors because the ethyl cellulose resin is poor in strength and adhesiveness.

Also, it is not only necessary to thin a dielectric layer but also to thin and smooth an inner electrode layer in order to realize a compact and high-capacity multilayer ceramic capacitor.

SUMMARY OF THE INVENTION

An aspect of the present invention provides a conductive paste composition for inner electrodes having excellent printability and adhesiveness with a dielectric layer, and a method of manufacturing a multilayer ceramic capacitor using the same.

According to an aspect of the present invention, there is provided a conductive paste composition for inner electrodes, including: a metal powder having an average particle size ranging from 50 nm to 300 nm; and 4 to 10 parts by weight of a binder resin containing at least one resin selected from the group consisting of a high-molecular-weight polyvinylbutyral resin having a weight-average molecular weight of 250 thousand to 400 thousand, a low-molecular-weight polyvinylbutyral resin having a weight-average molecular weight of 50 thousand to 150 thousand, and a rosin ester.

A content of the low-molecular-weight polyvinylbutyral resin may be 1.5 times or less than that of the high-molecular-weight polyvinylbutyral resin.

A content of the rosin ester may be 1.5 times or less than the total content of the high-molecular-weight polyvinylbutyral resin and low-molecular-weight polyvinylbutyral resin.

The metal powder may include nickel (Ni) or a Ni alloy.

According to another aspect of the present invention, there is provided a method of manufacturing a multilayer ceramic capacitor, the method including: preparing a plurality of ceramic green sheets; manufacturing a conductive paste composition for inner electrodes which is dispersion-treated, the conductive paste composition including a metal powder having an average particle size ranging from 50 nm to 300 nm, and 4 to 10 parts by weight of a binder resin containing at least one resin selected from the group consisting of a high-molecular-weight polyvinylbutyral resin having a weight-average molecular weight of 250 thousand to 400 thousand, a low-molecular-weight polyvinylbutyral resin having a weight-average molecular weight of 50 thousand to 150 thousand, and a rosin ester;

forming first and second inner electrode patterns on the ceramic green sheets using the conductive paste composition; forming a ceramic laminate by laminating the ceramic green sheets with the first and second inner electrode patterns formed thereupon; cutting the ceramic laminate so as to alternately expose ends of the first and second inner electrode patterns through ends thereof, and firing the cut ceramic laminate to form a ceramic sintered body; and forming first and second outer electrodes on the ends of the ceramic sintered body so as to be electrically connected to the ends of the first and second inner electrodes.

A content of the low-molecular-weight polyvinylbutyral resin may be 1.5 times or less than that of the high-molecular-weight polyvinylbutyral resin.

A content of the rosin ester may be 1.5 times or less than the total content of the high-molecular-weight polyvinylbutyral resin and low-molecular-weight polyvinylbutyral resin.

The metal powder may include nickel (Ni) or a Ni alloy.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
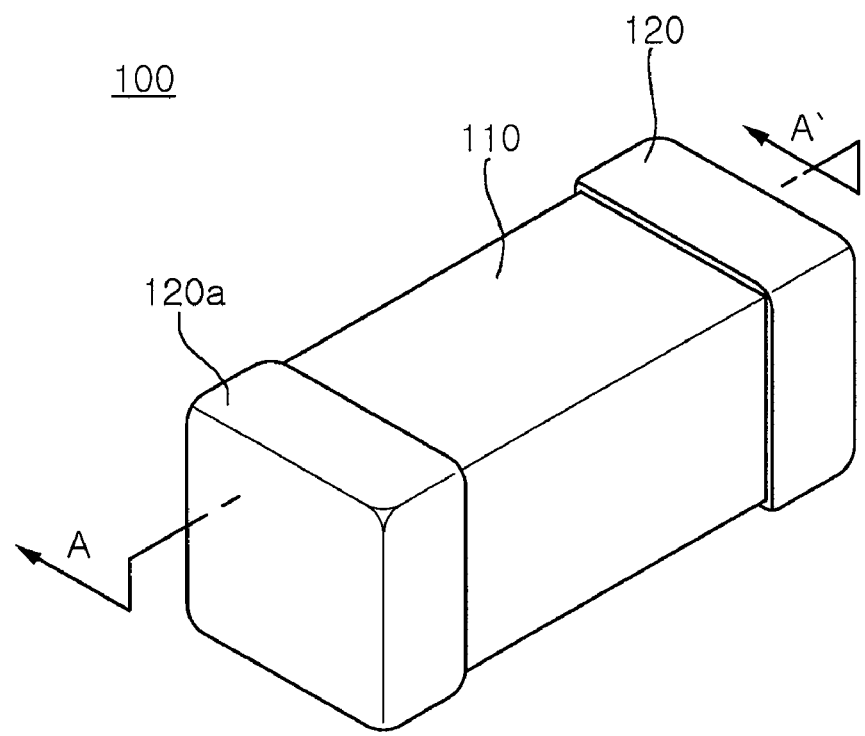
FIG. 1 is a schematic perspective view of a multilayer ceramic capacitor according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

Figure 2:
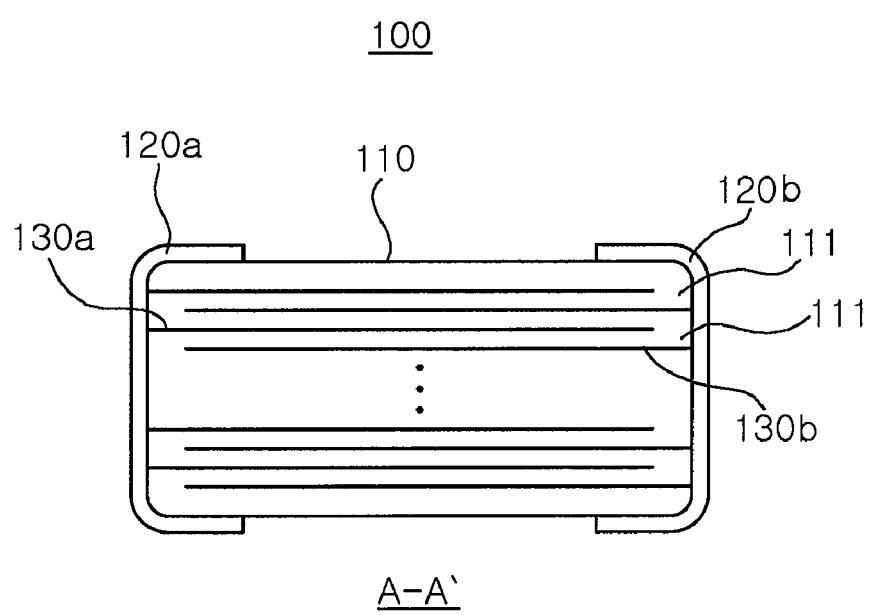
FIG. 2 is a cross-sectional view taken along line A-A' of FIG. 1.

FIG. 1 is a schematic perspective view of a multilayer ceramic capacitor 100 according to an embodiment of the present invention. FIG. 2 is a cross-sectional view taken along line A-A' of FIG. 1.

Referring to FIGS. 1 and 2, the multilayer ceramic capacitor 100 according to the current embodiment includes a ceramic sintered body 110, first and second inner electrodes 130a and 130b formed in the ceramic sintered body 110, and first and second outer electrodes 120a and 120b electrically connected to the first and second inner electrodes 130a and 130b.

The ceramic sintered body 110, which is obtained by laminating a plurality of ceramic dielectric layers 111 and sintering them, is integrally formed so that interfaces between the adjacent dielectric layers are barely distinguishable.

The ceramic dielectric layer 111 may be comprised of a ceramic material having a high dielectric constant; however, it is not limited thereto. For example, the ceramic dielectric layer 111 may be comprised of barium titanate ($BaTiO_3$), a lead complex perovskite-based material, a strontium titanate ($SrTiO_3$)-based material, or the like.

The first and second inner electrodes 130a and 130b are formed between the dielectric layers during the lamination of the plurality of dielectric layers, and specifically, are formed in the ceramic sintered body 110 through a sintering process with the dielectric layer interposed therebetween.

The first and second inner electrodes 130a and 130b, which are a pair of electrodes having different polarities, are arranged to face each other along a direction of lamination of the dielectric layers, and electrically insulated from each other by means of the dielectric layers.

Ends of the first and second inner electrodes 130a and 130b are alternately exposed to both ends of the ceramic sintered body 110. The ends of the first and second inner electrodes exposed to the ends of the ceramic sintered body 110 are electrically connected to the first and second outer electrodes 120a and 120b, respectively.

When a predetermined voltage is applied to the first and second outer electrodes 120a and 120b, charges are accumulated between the first and second inner electrodes 130a and 130b facing each other, and thus the capacitance of the multilayer ceramic capacitor is proportional to areas of the first and second inner electrodes 130 and 130b facing each other.

The first and second inner electrodes 130a and 130b are formed by firing a paste including a conductive metal, a ceramic inhibitor, a binder and a solvent.

More specifically, a conductive paste composition for inner electrodes according to an embodiment of the present invention includes a metal powder having an average particle size ranging from 50 nm to 300 nm, and a binder resin containing at least one resin selected from the group consisting of a high-molecular-weight polyvinylbutyral resin having a weight-average molecular weight of 250 thousand to 400 thousand, a low-molecular-weight polyvinylbutyral resin having a weight-average molecular weight of 50 thousand to 150 thousand, and a rosin ester. Here, the conductive paste composition is characterized in that it is subjected to dispersion treatment.

The dispersion treatment, although not specifically limited, may be performed using, for example, a 3-roll milling or bead milling process. The dispersability of metal powders can be improved through the dispersion treatment, thereby preventing gelation or phase separation.

The conductive paste composition for inner electrodes according to the current embodiment has excellent adhesiveness with a dielectric layer and excellent printability. Accordingly, a delamination phenomenon from the dielectric layer does not occur during manufacturing of a multilayer ceramic capacitor, and also cracking does not occur even after plasticizing and firing processes. Consequently, it is possible to manufacture a multilayer ceramic capacitor with good reliability.

Although not limited thereto, the metal powder may be comprised of, for example, nickel (Ni) or a Ni alloy. The Ni alloy may contain manganese (Mn), chromium (Cr), cobalt (Co), or aluminum (Al), together with Ni. The metal powder may have an average particle size ranging from 50 nm to 300 nm. More specifically, the metal powder may include a metal powder having an average particle size ranging from 50 nm to 100 nm, a metal powder having an average particle size ranging from 100 nm to 200 nm, and a metal powder having an average particle size ranging from 200 nm to 300 nm. The types and contents of resins contained in the binder resin may be appropriately controlled so as to achieve a desired viscosity according to the average particle size of the metal powder. For example, because a specific surface area is small in the case of using metal powders with a large average particle size, the total content of the binder resin may be reduced.

In the current embodiment, the binder resin may include at least one resin selected from the group consisting of a high-molecular-weight polyvinylbutyral resin having a weight-average molecular weight of 250 thousand to 400 thousand, a low-molecular-weight polyvinylbutyral resin having a weight-average molecular weight of 50 thousand to 150 thousand, and a rosin ester.

The total content of the binder resin may be 4 to 10 parts by weight based on 100 parts by weight of the metal powder.

If the content of the binder resin is less than 4 parts by weight, the content of resin is insufficient, as compared to the total specific surface area of the metal powder, causing dispersability and printability to be deteriorated. On the other hand, if the content of the binder resin exceeds 4 parts by weight, residual carbon may exist during plasticizing and firing processes, which may deteriorate the properties of a multilayer ceramic capacitor and an electrode connection and reduce coverage.

The conductive paste composition for inner electrodes according to the current embodiment may be realized to have various ranges of viscosity by adjusting a content ratio among three types of resins included in the binder resin.

In general, inner electrodes are formed with screen printing or Gravure printing. The conductive paste composition for inner electrodes according to the current embodiment makes it easy to achieve appropriate viscosity according to various printing processes such as screen printing or Gravure printing.

If the content of a high-molecular-weight polyvinylbutyral resin is high, the conductive paste composition for inner electrodes according to the current embodiment may exhibit high viscosity, which may be suitable for screen printing. For example, the conductive paste composition may have a viscosity ranging from 3.0 Pa·s to 30 Pa·s by including a high-molecular-weight polyvinylbutyral resin only. This is suitably applicable to screen printing.

Also, the conductive paste composition for inner electrodes according to the current embodiment includes a low-molecular-weight polyvinylbutyral resin having a weight-average molecular weight of 50 thousand to 150 thousand, and may reduce viscosity by increasing the content of the low-molecular-weight polyvinylbutyral resin. In this case, it is possible to reduce the viscosity without a decrease in adhesiveness with the dielectric layer.

For instance, a paste composition having a viscosity of 0.1 Pa·s to 2.0 Pa·s is required for use in Gravure printing, and a low-viscosity paste may thus be formed by adding a low-molecular-weight polyvinylbutyral resin having a weight-average molecular weight of 50 thousand to 150 thousand of which the content is 1.5 times or less than that of a high-molecular polyvinylbutyral resin.

The conductive paste composition for inner electrodes according to the current embodiment includes a rosin ester, and may reduce viscosity by increasing the content of the rosin ester. In this case, the viscosity may be lowered without a decrease in adhesiveness with the dielectric layer and a decrease in printability.

The rosin ester, although not limited thereto, may employ a rosin ester having a softening point of 80° C. or less, Tg is 50° C., and a weight-average molecular weight is 500 to 2,000. The content of the rosin ester added may be 1.5 times or less than the total content of the high-molecular polyvinylbutyral resin and the low-molecular polyvinylbutyral resin. Accordingly, a low-viscosity paste may be formed.

The conductive paste composition according to the current embodiment may include a ceramic inhibitor in addition to the above-described ingredients, and the content of the ceramic inhibitor may be 2 to 6 parts by weight based on 100 parts by weight of the metal powder. As described above, in the conductive paste composition for inner electrodes according to the current embodiment, the dispersability of the metal powder and ceramic inhibitor is excellent by virtue of dispersion treatment so that gelation or phase separation does not occur.

Also, a solvent of the conductive paste composition for inner electrodes may include, but is not limited to, terpineol, dihydroterpineol, butyl carbitol, kerosene, or the like.

The first and second outer electrodes 120a and 120b are formed of a conductive metal. Although not limited thereto, the first and second outer electrodes 120a and 120b may be comprised of copper (Cu), a Cu alloy, Ni, a Ni alloy, silver (Ag), palladium (Pd), or the like.

Hereinafter, a method of manufacturing the multilayer ceramic capacitor according to the embodiment of the present invention will be described.

First, a plurality of ceramic green sheets are prepared. The ceramic green sheet is prepared in such a manner that a slurry is made by mixing a ceramic powder, a binder and a solvent, and the slurry is then made in the shape of a sheet having a thickness of several micrometers through a doctor-blade method.

A conductive paste for inner electrodes is applied to the surface of the ceramic green sheet, thereby forming first and second inner electrode patterns.

As set forth above, the conductive paste for inner electrodes may be manufactured by: mixing a metal powder having an average particle size ranging from 50 nm to 300 nm, and 4 to 10 parts by weight of a binder resin containing at least one resin selected from the group consisting of a high-molecular-weight polyvinylbutyral resin having a weight-average molecular weight of 250 thousand to 400 thousand, a low-molecular-weight polyvinylbutyral resin having a weight-average molecular weight of 50 thousand to 150 thousand, and a rosin ester; and performing dispersion treatment. Furthermore, the conductive paste for inner electrodes may include a ceramic inhibitor, a solvent, or the like.

More specifically, the conductive paste composition for inner electrodes may be prepared so as to have a viscosity ranging from 3.0 Pa·s to 30 Pa·s, and then the inner electrode patterns may be formed by screen printing.

Alternatively, the conductive paste composition for inner electrodes may be prepared so as to have a viscosity ranging from 0.14 Pa·s to 2.0 Pa·s, and then the inner electrode patterns may be formed by Gravure printing.

As described above, a paste having the viscosity ranging from 0.1 Pa·s to 2.0 Pa·s may be prepared by adding a low-molecular-weight polyvinylbutyral resin having a weight-average molecular weight of 50 thousand to 150 thousand to the conductive composition for inner electrodes, and adjusting the content of the low-molecular-weight polyvinylbutyral resin.

Thereafter, the green sheets with the first and second inner electrodes formed are laminated, and the laminated ceramic green sheets and the inner electrode pastes are pressed by applying pressure in a direction of lamination. Hereby, a ceramic laminate in which the ceramic green sheets and the inner electrode pastes are alternately laminated is manufactured.

Afterwards, the ceramic laminate is cut into a chip in each area corresponding to a unit capacitor. Herein, the cutting is performed such that ends of the first and second inner electrode patterns are alternately exposed to ends thereof.

Next, the ceramic laminate chip is fired at, for example, 1,200° C. to thereby form a ceramic sintered body. The ceramic sintered body is surface-polished by treating it in a barrel containing water and polishing media. The surface polishing may be performed during manufacturing of the ceramic laminate.

After that, first and second outer electrodes are formed such that they cover ends of the ceramic sintered body and are electrically connected to the first and second inner electrodes. Subsequently, the surfaces of the outer electrodes may be plated with Ni, tin (Sn), or the like.

Pastes for inner electrodes were prepared under conditions of Table 1 below, and multilayer ceramic capacitors containing the paste were manufactured.

TABLE 1

|  | Ni size (nm) | Ni content (Wt. %) | HM-PVB (Wt. %) | LM-PVB (Wt. %) | Rosin ester (Wt. %) | HM-PVB/ LM-PVB | PVB/rosin ester | Viscosity (Pa · s) |
|---|---|---|---|---|---|---|---|---|
| Embodiment 1 | 50~100 | 50 | 2.5 | 0 | 0 | — | — | 6.0 |
| Embodiment 2 | 50~100 | 50 | 3.0 | 0 | 0 | — | — | 8.0 |

TABLE 1-continued

|  | Ni size (nm) | Ni content (Wt. %) | HM-PVB (Wt. %) | LM-PVB (Wt. %) | Rosin ester (Wt. %) | HM-PVB/ LM-PVB | PVB/rosin ester | Viscosity (Pa · s) |
|---|---|---|---|---|---|---|---|---|
| Embodiment 3 | 50~100 | 50 | 3.5 | 0 | 0 | — | — | 15.0 |
| Embodiment 4 | 50~100 | 50 | 2.0 | 1.0 | 0 | 2/1 | — | 5.0 |
| Embodiment 5 | 50~100 | 50 | 1.5 | 1.5 | 0 | 1/1 | — | 1.5 |
| Embodiment 6 | 50~100 | 50 | 1.6 | 2.4 | 0 | 2/3 | — | 2.3 |
| Embodiment 7 | 50~100 | 50 | 1.0 | 0 | 1.5 | — | 2/3 | 0.4 |
| Embodiment 8 | 50~100 | 50 | 1.2 | 0 | 1.8 | — | 2/3 | 1.0 |
| Embodiment 9 | 50~100 | 50 | 1.0 | 1.0 | 1.5 | 1/1 | 4/3 | 1.2 |
| Embodiment 10 | 100~200 | 50 | 2.0 | 0 | 0 | — | — | 3.0 |
| Embodiment 11 | 100~200 | 50 | 2.5 | 0 | 0 | — | — | 5.0 |
| Embodiment 12 | 100~200 | 50 | 3.0 | 0 | 0 | — | — | 7.0 |
| Embodiment 13 | 100~200 | 50 | 3.5 | 0 | 0 | — | — | 12.0 |
| Embodiment 14 | 100~200 | 50 | 2.0 | 1.0 | 0 | 2/1 | — | 4.0 |
| Embodiment 15 | 100~200 | 50 | 1.5 | 1.5 | 0 | 1/1 | — | 1.2 |
| Embodiment 16 | 100~200 | 50 | 1.6 | 2.4 | 0 | 2/3 | — | 1.7 |
| Embodiment 17 | 100~200 | 50 | 1.0 | 0 | 1.5 | — | 2/3 | 0.3 |
| Embodiment 18 | 100~200 | 50 | 1.2 | 0 | 1.8 | — | 2/3 | 0.8 |
| Embodiment 19 | 100~200 | 50 | 1.0 | 1.0 | 1.5 | 1/1 | 4/3 | 1.0 |
| Embodiment 20 | 200~300 | 50 | 2.0 | 0 | 0 | — | — | 3.0 |
| Embodiment 21 | 200~300 | 50 | 2.5 | 0 | 0 | — | — | 4.0 |
| Embodiment 22 | 200~300 | 50 | 3.0 | 0 | 0 | — | — | 6.0 |
| Embodiment 23 | 200~300 | 50 | 3.5 | 0 | 0 | — | — | 10.0 |
| Embodiment 24 | 200~300 | 50 | 2.0 | 1.0 | 0 | 2/1 | — | 3.5 |
| Embodiment 25 | 200~300 | 50 | 1.5 | 1.5 | 0 | 1/1 | — | 1.1 |
| Embodiment 26 | 200~300 | 50 | 1.6 | 2.4 | 0 | 2/3 | — | 1.5 |
| Embodiment 27 | 200~300 | 50 | 1.0 | 0 | 1.5 | — | 2/3 | 0.3 |
| Embodiment 28 | 200~300 | 50 | 1.2 | 0 | 1.8 | — | 2/3 | 0.6 |
| Embodiment 29 | 200~300 | 50 | 1.0 | 1.0 | 1.5 | 1/1 | 4/3 | 0.8 |

In Table 1 above, the symbols "HM-PVB" and "LM-PVB" denote low-molecular-weight polyvinylbutyral and low-molecular-weight polyvinylbutyral, respectively.

The printability of each of the prepared multilayer ceramic capacitors was assessed by measuring the roughness of a dry layer of each multilayer ceramic capacitor, and adhesiveness, lamination property and delamination after being cut were assessed on the basis of following criteria. The results are listed in Table 2 below.

* adhesiveness, printability, lamination property
  ⊚: very good, ○: good

TABLE 2

|  | Adhesiveness | Printability | Lamination | Delamination after cut |
|---|---|---|---|---|
| Embodiment 1 | ○ | ⊚ | ○ | None |
| Embodiment 2 | ⊚ | ⊚ | ⊚ | None |
| Embodiment 3 | ⊚ | ⊚ | ○ | None |
| Embodiment 4 | ○ | ⊚ | ○ | None |
| Embodiment 5 | ○ | ○ | ○ | None |
| Embodiment 6 | ⊚ | ⊚ | ⊚ | None |
| Embodiment 7 | ○ | ⊚ | ○ | None |
| Embodiment 8 | ○ | ○ | ○ | None |
| Embodiment 9 | ⊚ | ⊚ | ⊚ | None |
| Embodiment 10 | ○ | ○ | ○ | None |
| Embodiment 11 | ⊚ | ⊚ | ○ | None |
| Embodiment 12 | ⊚ | ⊚ | ⊚ | None |
| Embodiment 13 | ⊚ | ⊚ | ○ | None |
| Embodiment 14 | ⊚ | ⊚ | ○ | None |
| Embodiment 15 | ⊚ | ○ | ○ | None |
| Embodiment 16 | ⊚ | ⊚ | ⊚ | None |
| Embodiment 17 | ○ | ⊚ | ○ | None |
| Embodiment 18 | ○ | ○ | ○ | None |
| Embodiment 19 | ⊚ | ⊚ | ⊚ | None |
| Embodiment 20 | ○ | ○ | ⊚ | None |
| Embodiment 21 | ⊚ | ⊚ | ⊚ | None |
| Embodiment 22 | ⊚ | ○ | ○ | None |
| Embodiment 23 | ⊚ | ○ | ○ | None |
| Embodiment 24 | ⊚ | ○ | ○ | None |
| Embodiment 25 | ○ | ○ | ○ | None |
| Embodiment 26 | ⊚ | ○ | ○ | None |
| Embodiment 27 | ○ | ⊚ | ⊚ | None |
| Embodiment 28 | ⊚ | ⊚ | ⊚ | None |
| Embodiment 29 | ⊚ | ⊚ | ⊚ | None |

As set forth above, according to exemplary embodiments of the invention, a conductive paste composition for inner electrodes has excellent adhesiveness with a dielectric layer and printability. Accordingly, a delamination phenomenon from the dielectric layer does not occur during manufacturing of a multilayer ceramic capacitor, and cracking does not occur even after plasticizing and firing processes. Consequently, it is possible to manufacture a multilayer ceramic capacitor with good reliability in the case of using the conductive paste composition for inner electrodes according to the present invention.

In addition, the conductive paste composition for inner electrodes according to the present invention makes it easy to control viscosity according to various printing processes such as screen printing or Gravure printing.

While the present invention has been shown and described in connection with the exemplary embodiments, it will be apparent to those skilled in the art that modifications and variations can be made without departing from the spirit and scope of the invention as defined by the appended claims.

What is claimed is:

1. A conductive paste composition for inner electrodes, comprising:
   a metal powder having a particle size ranging from 50 nm to 300 nm; and
   a binder resin, the binder resin including a high-molecular-weight polyvinylbutyral resin having a molecular weight of 250 thousand to 400 thousand, a low-molecular-weight polyvinylbutyral resin having a molecular weight of 50 thousand to 150 thousand, and a rosin ester, wherein in the conductive paste composition, the weight ratio of the binder resin to the metal powder is between 0.04 and 0.10, and in the binder resin, the weight ratio of the low-molecular-weight polyvinylbutyral resin to the high-molecular-weight polyvinylbutyral resin is between 0.5 and 1.5.

2. The conductive paste composition of claim 1, wherein in the binder resin, the ratio of the weight of the rosin ester to the total weight of the high-molecular-weight polyvinylbutyral resin and low-molecular-weight polyvinylbutyral resin is between 0.75 and 1.5.

3. The conductive paste composition of claim 1, wherein the metal powder comprises nickel (Ni) or a Ni alloy.

4. A method of manufacturing a multilayer ceramic capacitor, the method comprising:

preparing a plurality of ceramic green sheets;

manufacturing a conductive paste composition for inner electrodes which is dispersion-treated, the conductive paste composition comprising a metal powder having a particle size ranging from 50 nm to 300 nm, and a binder resin, the binder resin including a high-molecular-weight polyvinylbutyral resin having a molecular weight of 250 thousand to 400 thousand, a low-molecular-weight polyvinylbutyral resin having a molecular weight of 50 thousand to 150 thousand, and a rosin ester;

forming first and second inner electrode patterns on the ceramic green sheets using the conductive paste composition;

forming a ceramic laminate by laminating the ceramic green sheets with the first and second inner electrode patterns formed thereupon;

cutting the ceramic laminate so as to alternately expose ends of the first and second inner electrode patterns through ends thereof, and firing the cut ceramic laminate to form a ceramic sintered body; and forming first and second outer electrodes on the ends of the ceramic sintered body so as to be electrically connected to the ends of the first and second inner electrodes, wherein the conductive paste composition is manufactured such that the weight ratio of the binder resin to the metal powder is between 0.04 and 0.10, and the binder resin is manufactured such that the weight ratio of the low-molecular-weight polyvinylbutyral resin to the high-molecular-weight polyvinylbutyral resin is between 0.5 and 1.5.

5. The method of claim 4, wherein the binder resin is manufactured such that the ratio of the weight of the rosin ester to the total weight of the high-molecular-weight polyvinylbutyral resin and low-molecular-weight polyvinylbutyral resin is between 0.75 and 1.5.

6. The method of claim 4, wherein the metal powder comprises nickel (Ni) or a Ni alloy.

* * * * *